Aug. 5, 1952  J. A. MILLER  2,605,506
MANUFACTURE OF PLASTIC ARTICLES
Filed April 9, 1949  2 SHEETS—SHEET 1
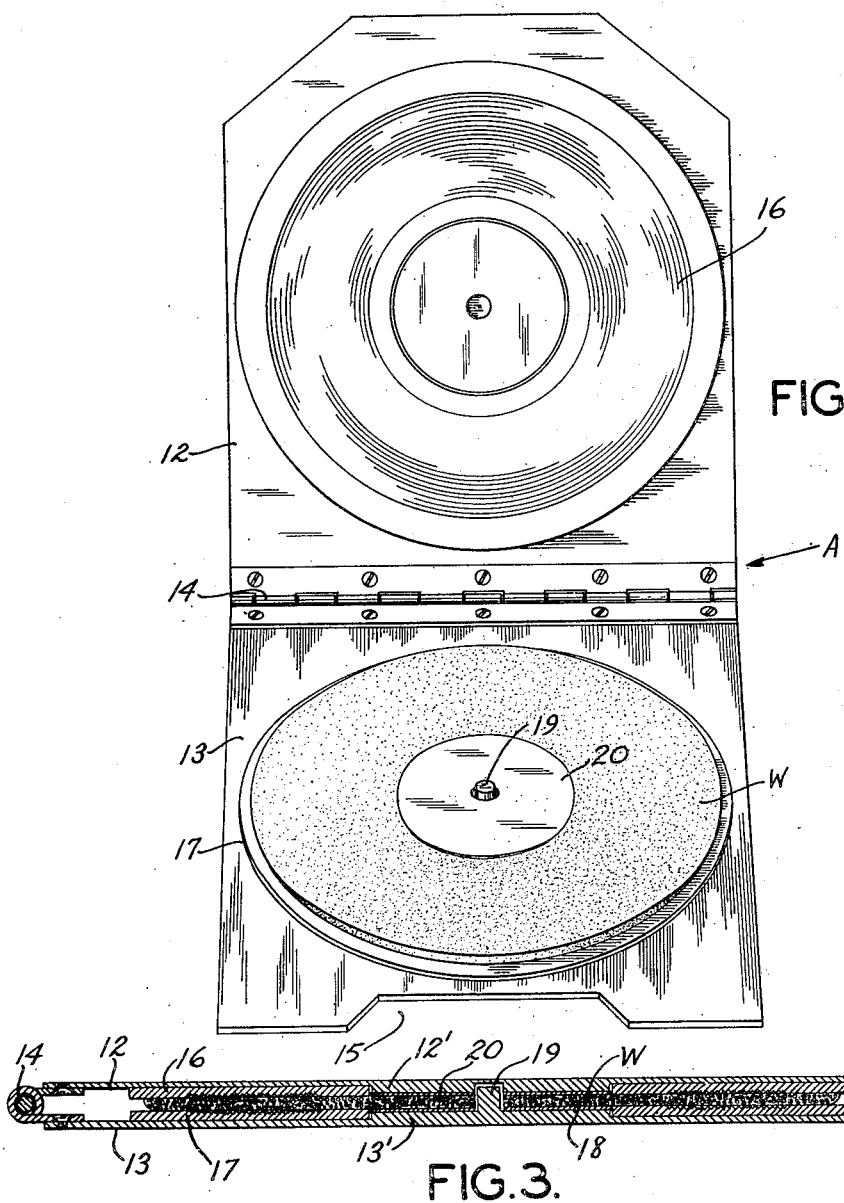
INVENTOR
JAMES A. MILLER
BY
Campbell Brumbaugh Free & Graves
his ATTORNEYS.

Aug. 5, 1952 J. A. MILLER 2,605,506
MANUFACTURE OF PLASTIC ARTICLES
Filed April 9, 1949 2 SHEETS—SHEET 2
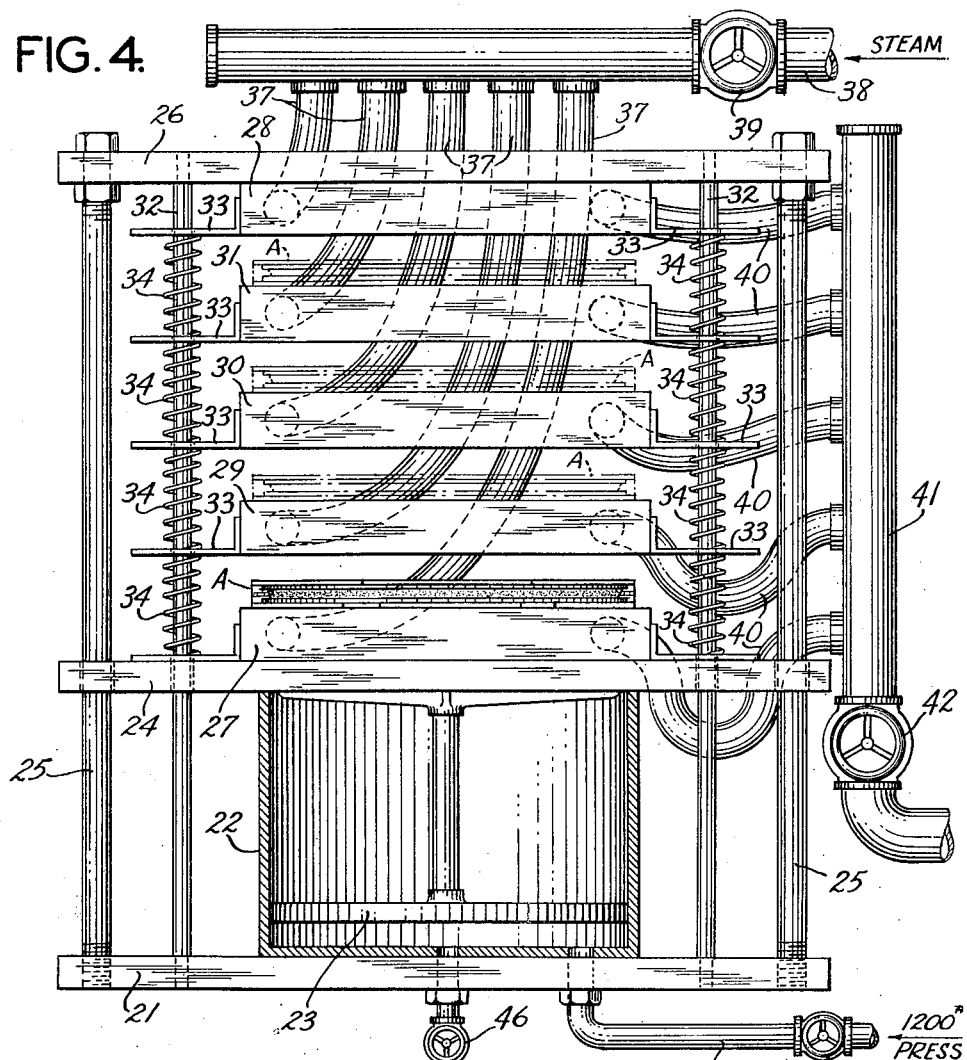
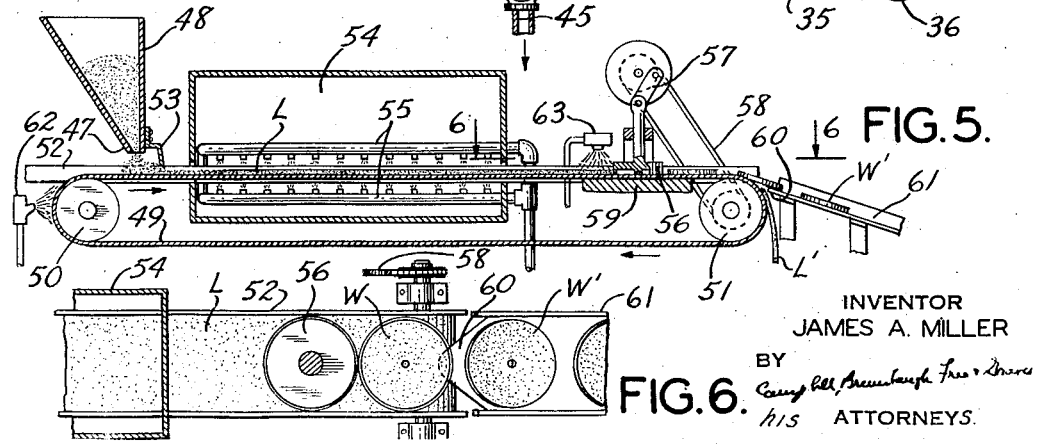
INVENTOR
JAMES A. MILLER
BY
his ATTORNEYS.

Patented Aug. 5, 1952

2,605,506

UNITED STATES PATENT OFFICE 2,605,506

MANUFACTURE OF PLASTIC ARTICLES

James A. Miller, Darien, Conn.

Application April 9, 1949, Serial No. 86,488

9 Claims. (Cl. 18—48.3)

This invention relates to the manufacture of plastic articles, and has particular reference to methods for quantity production of phonograph records and the like, although the invention is not limited to that use.

During recent years synthetic plastic records have largely replaced the shellac records for reproducing phonographic recordings of music and the like. Of the synthetic plastics which have been used for this purpose, the vinyl resins, particularly a copolymer of polyvinyl chloride and polyvinyl acetate, have proven to be the most adaptable to this purpose, because their characteristic hardness and toughness enable them to resist wear and breakage and permit the formation of sharp impressions from the metal dies or stampers, and also because of their attractive crystal-like appearance.

However, the same properties of these vinyl resins which render them adaptable for phonographic records also cause manufacturing difficulties, particularly where the grooves are closely spaced and must be sharply defined as in the recently-announced long-playing records, since the resin is inherently rubbery even when heated to a high degree, and consequently, resists flowing when it is placed under pressure and bridges the grooves without completely filling them. If inordinately high pressures are used in the effort to correct this condition, the fine ridges defining the grooves on the die or stamper are bent or otherwise deformed by the semi-plastic resin as it resists flowing. When the expedient of increasing flowability by utilizing a substantial quantity of plasticizer is resorted to, the finished product becomes so brittle that the desirable advantages of vinyl resins are largely lost. Also, it is difficult to distribute the plasticizer evenly throughout the resin which appears to resist such dispersion, so that plasticizing is non-uniform and does not solve the problem. The same problem of pigment dispersion confronts the manufacturer when he attempts to distribute coloring pigments through the plastic, and unless the resin is re-milled with both the plasticizer and pigment the use of neither ingredient satisfactorily produces the intended result. Moreover, re-milling materially increases the expense and does not eliminate the brittleness ensuing from the use of sufficient plasticizer to attain the desired flowability under stamping pressure.

In accordance with the present invention, a method of manufacturing records and other articles of synthetic resin, particularly the vinyl resins, is provided which is simple and inexpensive and produces records and other articles of the unadulterated resin, without requiring plasticizers to render the material moldable and without requiring high degrees of pressure or heat.

The preferred mode of conducting the method of this invention comprises filling a shallow pan having the approximate diameter of the finished record and a depth of between three and four times the finished thickness with the finely-divided resin in dry form; heating the pan and its contents to a temperature such that the particles soften and frit together to form a self-sustaining but porous, spongy, pancake-like wafer; placing the wafer between the stampers or dies bearing the recorded impressions, and simultaneously applying heat and pressure to the opposite surfaces of the stampers or dies under such conditions that the pressure is uniform over every unit of area of the wafer and it is heated uniformly throughout, so that the heat-softened grains constituting the wafer are consolidated and united into a homogeneous disc having the clarity and sparkle characteristic of the resin. Coloring is achieved by dyeing the resin powder before it is formed into the wafer. In an alternative method of making the wafer, the resin powder is formed in a continuous layer of uniform thickness, run through an oven in which the particles are fritted together to form the aforementioned sponge-like strip and the wafers are stamped from this continuous strip. The wafers are then formed into the finished articles in the manner described.

The preferred apparatus for forming the finished article includes a wafer holder comprising two plates hinged together and having the opposite dies or stampers secured to their abutting faces in registry with a center pin corresponding to the hole in the finished record and on which the usual paper labels may be aligned for identifying both sides of the record. The holder is closed upon the wafer with the two stampers or dies in contact with the corresponding opposite faces of the wafer, and the holder is placed in a press along with several other holders of the same construction, and heat and pressure simultaneously applied thereto in the manner described.

It will be seen that the method of this invention provides very simple and effective means for manufacturing phonograph records and other similar plastic articles in faithful and precise conformance to the finest grooves on a reproducing die or stamper, with uniformity throughout the entire record, since pressure and heat are applied uniformly over its every unit of area on both surfaces under such conditions that a homogeneous, finished product results which may be duplicate many more times with the same stampers or dies than has been possible heretofore, because there is little strain or friction on the die to cause it to be distorted, deformed or worn materially except only after very many repeated uses.

For a more complete understanding of the invention, reference may be had to the accompanying drawings, in which:

Figure 1 illustrates a transverse section through the pan filled with the finely-divided resin prior to heating to form the wafer;

Fig. 2 illustrates the holder in which the wafer is placed between the recording stamping dies preparatory to pressing and heat treating;

Fig. 3 is a transverse section through the holder with the wafer placed between the stamping dies prior to insertion in the press;

Fig. 4 is a semi-diagrammatic elevation of a multiple press showing heating and cooling means leading to the plates between which the holders containing the wafers are placed for simultaneously pressing and heat treatment;

Fig. 5 illustrates an apparatus for automatically forming the wafers; and

Fig. 6 is a plan view of a portion of the apparatus shown in Fig. 5, as seen along the line 6—6 thereof.

The material from which the finished phonograph records or other plastic articles are manufactured according to the invention, preferably consists of a suitable copolymer of vinyl chloride and vinyl acetate in finely-divided form of a commercial particle size on the order of 50 microns. Suitable polyvinyl chloride-acetate in that form consists of 80% to 95% vinyl chloride and the remainder vinyl acetate, and is marketed as a molding powder under the trade name "Vinylite." Although the polyvinyl chloride-acetate has been found satisfactory, other resins having similar properties may be employed with equal facility, such as that class of polymeric amides marketed under the name nylon, although higher temperatures and pressures are then required than with the vinyl resins.

The commercial polyvinyl chloride-acetate molding powder may be employed to manufacture articles having the crystal-like appearance characteristic of that material, or it may be colored in accordance with the invention by mixing the powder with a saturated solution of an aniline dye in commercial ethyl alcohol or other solvent which is not a complete solvent of the resin. A small amount of this solution, on the order of one pint to fifty pounds of the powder is sufficient to effect uniform coloring. The dye penetrates the powder with considerable speed and ease after only a small degree of mixing, probably because of the capillarity of the powder.

The colored or uncolored dry powder is level-filled into a pan 10, shown in Fig. 1, this pan having a diameter at least as large as the diameter of the finished record and an inside depth equal to between three or four times the thickness of the finished record. Thus, if the finished record is to be .04 inch thick, the pan 10 is about .15 inch deep. The pan has a central hole 11, and when the surplus powder is scraped off of the pan, the powder overlying the hole 11 flows through the latter and a hole appears in the center of the layer as shown in Fig. 1.

In order to preclude sticking of the powder to the interior of the pan 10 during the subsequent heating and also during the stamping operation, the interior of the pan 10 is sprayed with a solution of a suitable lubricant for the resin, preferably a saturated solution of carnauba wax in commercial ethyl alcohol. The spraying is effected with an ordinary air atomizer, and when the alcohol evaporates, a thin film of the wax remains on the interior of the pan.

The pan 10, filled with the resin powder in the manner described, is placed in any suitable oven and heated to a temperature at which the particles of resin frit together in an action comparable to "sintering" in that the surfaces of the particles fuse and soften so as to become sticky, but the particles are not molten and do not coalesce or run together. The sintering temperature depends upon the length of time in which this formation of the wafer takes place, and temperatures of between about 250° and 300° F., preferably about 275° F. for a period of five minutes has been found satisfactory in actual practice, but it will be understood that the temperature and time will vary in accordance with the method of heating that is employed.

As a result of this heating operation, a highly porous, spongy, but self-sustaining wafer designated W in Fig. 1 is formed in the pan 10. The proper condition of sponginess may be readily determined by feel and a slight finger pressure on the surface results in an indentation, thereby indicating that the fritting or the "sintering" operation has been completed. Before removing the wafer W from the pan 10 and preferably after it has cooled somewhat, the upper or exposed surface of the wafer W is sprayed with the carnauba wax-alcohol solution. Upon removal of the wafer W from the pan 10, its upper and lower surfaces are accordingly coated with a thin layer of carnauba wax which, however, does not penetrate materially below the surface so that the wafer is constituted of the unadulterated dry resin formed into a matrix whose pores are filled with air.

The wafer W is then placed within the holder shown particularly in Figs. 2 and 3 and preferably constituting two plates 12 and 13 of heat conducting material, such as aluminum or an aluminum base alloy. These plates 12 and 13 are hinged together by a hinge 14 at one of their narrow ends, so as to open and close like a book. A notch 15 is preferably provided in one of the plates, such as lower plate 13, in order to facilitate separation of the plates 12 and 13 after the pressing operation. Secured to or formed integrally on the inner surfaces of the plates 12 and 13 are center bosses 12' and 13' each of which is encircled by the respective upper and lower stamping dies 16 and 17, which are mounted concentrically with a pin 19 on lower plate 13 and a corresponding socket in plate 16. The stamping dies preferably are cemented to the corresponding inner surfaces of the plates 12 and 13 by a suitable thermo-plastic cement, such as a rubber base cement which will permit replacement of the stamping dies, when desired.

The stamping dies 16 and 17 are well known, and consist of circular metal discs or plates on which the spiral grooves or tracks are engraved during recording of the music or other phonographic subject. The stampers 16 and 17 are usually chrome-plated, and the ridges defining the grooves are especially delicate and closely-spaced in the long-playing type of record, so that they are susceptible to deformation if subjected to lateral pressure as would occur if the resin were placed between the dies or stampers as a heat softened "biscuit" and flattened by pressure applied to the dies or stampers, as in the usual method.

In utilizing the holder A, the paper label shown in exaggerated thickness at 18 in Fig. 3, and identifying the phonographic recording on die or stamper 17, is first placed face down over the central pin 19, the wafer W is placed over the label 18 on pin 19 and then the paper label 20, identifying the recording on upper stamper or die 16, is placed on the wafer, whereupon the holder A is closed about hinge 14 thereby bringing the plates 12 and 13 into juxtaposition, as shown in Fig. 3.

The closed holder A containing the wafer W is placed in a press shown in Fig. 4, which is preferably arranged to accommodate more than one such holder A, say four, as in the press as shown. The press preferably consists of a base plate 21 mounted on a suitable support and carrying the hydraulic jack 22 whose piston 23 engages a floating platform 24 movable up and down on vertical tie rods 25 secured at their lower ends to the four corners of base plate 21 and at their upper ends to a stationary top plate 26. Mounted on platform 24 is a hollow rectangular flat anvil 27, and a similar hollow anvil 28 is secured to the underside of stationary top plate 26. Similar intermediate anvils 29, 30 and 31 are centered on rods 32 passing through cleats 33 secured to each of the anvils 28 to 31, inclusive, and are spaced apart by coil springs 34 encircling the rods 32 and located between each adjacent pair of cleats 33, as shown.

A source of fluid under pressure may be supplied to the hydraulic jack 22 through pipe 35 by opening valve 36, whereupon piston 23 raises platform 27 and with it the respective intermediate anvils 29, 30 and 31 toward the stationary upper anvil 28 while corresponding springs 34 are compressed. The press is opened by opening valve 46 in discharge pipe 45 leading from cylinder 22.

Heating fluid is supplied to the interior of each anvil by one of the steam pipes 37 leading from steam header 38 controlled by valve 39. Similarly connected to the interior of each of the anvils 27 to 31, inclusive, is one of the cooling pipes 40 for supplying a suitable cooling medium such as cold water from the header 41 when valve 42 is open.

In operation of the apparatus shown in Fig. 4 to convert the wafer W into a phonograph record, for example, the holder A containing the wafer W and closed in the form shown in Fig. 3, is placed between two of the adjacent anvils such as 27 and 29, as indicated in Fig. 4. Similarly, other closed holders A are placed between anvils 29—30, 30—31, and 31—28. All valves being closed, valve 36 is first opened to close the press on each of the holders A. A pressure on the order of 1200 pounds per square inch on the holders A has been found to be sufficient. At the same time, the anvils are heated by opening valve 39 to supply steam to the interior of the several anvils, which are heated to between about 300° F. and 350° F., preferably about 320° F. The actual heating time is less than one minute, the total heating period including that needed for transmitting the heat from the anvils through the plates 12 and 13 and the corresponding stamping dies from opposite directions to the wafer W to cause the resin to soften and coalesce under pressure into the homogeneous resin unit.

With the press still closed and under the aforementioned pressure, valve 39 is closed to terminate the heating cycle and valve 42 is simultaneously opened to circulate cooling water through the several anvils until the holders A are cooled to approximately room temperature. Upon termination of the cooling cycle, the press is reopened by first closing valve 36, opening valve 46, whereupon the springs 34 separate the anvils as the pressure fluid flows through purge pipe 45 in the manner readily understood.

Upon opening the holders A, the wafer W will be found to have been converted into a clear, homogeneous record of the predetermined color, with the identifying labels 18 and 20 applied to its opposite surfaces. The thin irregular fin at the periphery of the record is then trimmed off and trued to the finished diameter in the usual way.

During the heating and pressing operation, the air or other gases trapped in the myriad fine pores between the particles of the sintered wafer W will have disappeared, even though gas bubbles have been noted in the wafer while it is still soft. Probably the occluded gases are expelled through the edge of the wafer, although there is no evidence to that effect after large quantity production of the records. At any rate, the finished record shows no gas bubbles, but is a continuous, clear, homogeneous unit of pure unadulterated plastic having the sparkle and crystal clarity characteristic of the plastic without change, since no plasticizer impairing its desirable inherent properties has been used, the surface film of carnauba wax having been utilized merely to preclude sticking of the powder to the pan 10 in the first instance, and to the opposite stamping dies 16 and 17 during the pressing operation.

Because the pressure is applied by the anvils flatwise to the stampers, the resulting pressure on the wafer is distributed uniformly over every unit of area of both surfaces thereof, so that the material is pressed uniformly into each fine groove in the stamping dies, with the result that the finished record conforms precisely to the sharp, clear record grooves on the stamping dies. Also, since the pressure is normal to the surfaces of the stamping dies, the ridges forming the grooves therein are not injured nor do they become worn after very many stampings, because the material constituting the wafer, being flexible and porous, offers little or no frictional resistance, but merely compacts.

Instead of forming the molding powder into discs initially by means of pans 10, the colored or uncolored resin powder may be spread from the spout 47 of hopper 48 on the upper horizontal course of an endless flexible steel band 49 moving over pulleys or rollers 50 and 51 between stationary side walls 52 abutting the edges of the band, as shown in Figs. 5 and 6. The predetermined depth of between three and four times the thickness of the finished article is provided by adjustable doctor blade 53 mounted on hopper 48 and extending across the upper course of the band 49 between the side walls 52, as shown. The band 49 with its doctored layer L passes through a suitable oven 54 which may be heated by gas burners 55 to about 300° F. so that in its course through the oven 54 the powder constituting layer L is softened and frits or "sinters" together into a porous cake having the aforementioned characteristics of the wafer W.

As the sintered cake L leaves the oven 54 it is sufficiently cooled by the atmosphere so as to lose most of its stickiness, and is then cut into wafers W' by the stamp 56 reciprocated vertically by a crank 57 driven by a chain and sprocket combination 58 from driven pulley 51, as shown in Fig. 5. The stamp 56 constitutes a metal plate having a circular cutting rim and center thimble for stamping out the circular wafers W' having a center hole, as shown particularly in Fig. 6. In its cutting function, the stamp 56 cooperates with band 49, which is backed by a stationary support 59 positioned immediately beneath it.

The wafers W' are separated from the perforated layer L' by the pointed scoop 60, which catches under the leading edge of the wafer W' as it extends beyond the downcurve of the belt 48, which is closely followed by the layer L' as shown in Fig. 5. The chute 61, as a continuation of scoop 60, conducts the wafers W' to a suitable depository preparatory to molding in the die holders A of Figs. 2 and 3 in the manner previously described.

In order to coat the under surfaces of wafers W' with the carnauba wax or other lubricating film, the surface of the band 49 ahead of the hopper 48 is continuously coated with the aforementioned solution sprayed thereon by the spray head 62. Similarly, the upper surface of the sintered layer L, after it leaves the oven 54 and before it reaches stamper 56, is sprayed with the wax solution by spray head 63. In this way, both surfaces of the wafers W' are coated with a thin film of wax to preclude sticking to the stamping dies in holder A and also to band 49 and stamp 56.

Although the method of this invention is particularly adaptable to the manufacture of phonograph records and other relatively flat articles, the invention is also applicable to manufacture of articles of different shapes. In that case the wafer is formed by the sintering step into a rudimentary self-sustaining shape corresponding roughly to that of the finished product and it is then pressed in the presence of fusing heat into conformance with the contours of the mold or die. Also, it is to be understood that while preferred embodiments of the invention have been illustrated and described herein, the invention is not limited thereby, but is susceptible of variation in form and detail within the scope of the appended claims.

I claim:

1. The method of making articles of thermoplastic material of the class consisting of vinyl resins and nylon, said material being substantially devoid of plasticizer, which comprises forming said thermoplastic material in the form of finely-divided particles into a layer of loose particles having a rudimentary shape approximating that of the finished article, heating said layer of loose particles, without compressing it, to a temperature causing the particles to frit together into a self-sustaining porous, spongy unit, transferring the said unit to a mold, and compressing the porous, spongy unit in the mold in the presence of heat to consolidate and unite the porous, spongy unit into a solid, homogeneous article conforming to the mold.

2. The method of making substantially flat articles of thermoplastic material of the class consisting of vinyl resins and nylon, said material being substantially devoid of plasticizer, which comprises forming said thermoplastic material in the form of finely-divided particles into a relatively thin layer of loose particles having opposite, substantially flat surfaces and a rudimentary shape approximating that of the finished article, heating the said layer of loose particles while free of pressure to a temperature causing the particles to frit together into a self-sustaining porous, spongy unit thicker than said finished article, transferring the porous, spongy unit to a mold, and compressing the porous, spongy unit in the mold in a direction substantially normal to its opposite flat surfaces in the presence of heat to consolidate and unite the porous, spongy unit into a solid, homogeneous article conforming to the mold.

3. The method of making substantially flat articles of thermoplastic material of the class consisting of vinyl resins and nylon, said material being substantially devoid of plasticizer, which comprises forming said thermoplastic material in the form of finely-divided particles into a relatively thin layer of loose particles having opposite, substantially flat surfaces and a rudimentary shape approximating that of the finished article and three to four times as thick as said finished article, heating the said layer of loose particles to a temperature causing the particles to frit together into a self-sustaining porous, spongy unit without compressing said layer, transferring the said porous, spongy unit to a mold, and compressing the porous, spongy unit in the mold in a direction substantially normal to its opposite flat surfaces in the presence of plasticizing heat to consolidate and unite the porous, spongy unit into a solid, homogeneous article conforming to the mold.

4. The method of making substantially flat articles of thermoplastic material of the class consisting of vinyl resins and nylon, said material being substantially devoid of plasticizer, which comprises forming said thermoplastic material in the form of finely-divided particles into a relatively thin layer of loose particles having opposite, substantially flat surfaces and a rudimentary shape approximating that of the finished article, heating the said layer of loose particles, without compressing it, to a temperature causing the particles to frit together into a self-sustaining porous, spongy unit, transferring the said porous, spongy unit to a mold having a die surface abutting at least one flat face of said plate-like unit, and compressing the porous, spongy unit in said mold by forcing said die surface against the said abutting flat face of said unit and in the presence of plasticizing heat to consolidate and unite the porous, spongy unit into a solid, homogeneous article conforming to the mold.

5. The method of making disc-type phonograph records of thermoplastic material of the class consisting of vinyl resins and nylon, said material being substantially devoid of plasticizer, which comprises forming said thermoplastic material in the form of finely-divided particles into a layer of loose particles having a thickness in excess of that of the finished article, heating the said layer of loose particles, without compressing it, to a temperature causing the particles to frit together into a porous, spongy sheet, dividing said sheet into self-sustaining porous, spongy, plate-like units, transferring each said porous, spongy plate-like unit to a record press having at least one stamping die provided with recording grooves abutting at least one flat face of said porous, spongy plate-like unit, and compressing the porous, spongy, plate-like unit in the presence of plasticizing heat to consolidate and unite the unit into a solid, homogeneous disc record having the recording grooves impressed on its surface.

6. The method of making disc-type phonograph records of thermoplastic material of the class consisting of vinyl resins and nylon, said material being substantially devoid of plasticizer, which comprises forming said thermoplastic material in the form of finely-divided particles into a layer of loose particles having a thickness in excess of that of the finished record, heating the said layer of loose particles, without compressing it, to a temperature causing the particles to frit together into a porous, spongy sheet, dividing said sheet into a plurality of self-sustaining porous, spongy plate-like units, coating each porous, spongy unit with a film of lubricating material, transferring each said porous, spongy unit to a record press having at least one stamping die provided with record grooves abutting at least one flat face of said porous, spongy unit, and compressing the unit in the presence of plasticizing heat to consolidate and unite the unit into a solid, homogeneous disc record having the recording grooves impressed on its surface.

7. The method of making phonograph records and the like of thermoplastic material of the class consisting of vinyl resins and nylon, said material being substantially devoid of plasticizer, which comprises shaping the thermoplastic material in the form of finely-divided particles into a disc of loose particles having a diameter approximating that of the finished article and a thickness in excess of that of the finished article, heating the said disc of loose particles, without compressing it, to a temperature causing the particles to frit together into a self-sustaining porous, spongy wafer, placing said porous, spongy wafer between corresponding stamping dies engaging opposite surfaces of said wafer, at least one of said dies having recording grooves in its inner surface, and applying pressure flatwise to the outer surfaces of said stamping dies in the presence of plasticizing heat to consolidate and weld the wafer together into a solid, homogeneous disc having the recording grooves of said stamping die impressed into its corresponding surface.

8. A disc-type phonograph record made in accordance with the method set forth in claim 5.

9. A phonograph record made in accordance with the method set forth in claim 7.

JAMES A. MILLER.

REFERENCES CITED

The following references are of record in the file of this patent:

UNITED STATES PATENTS

| Number | Name | Date |
|---|---|---|
| 1,146,388 | Aylsworth | July 13, 1915 |
| 1,234,450 | Edison | July 24, 1917 |
| 1,405,484 | Burroughs | Feb. 7, 1922 |
| 1,558,175 | Jones | Oct. 20, 1925 |
| 1,653,524 | Webb | Dec. 20, 1927 |
| 1,865,586 | Petroff | July 5, 1932 |
| 2,269,267 | Hunter | Jan. 6, 1942 |
| 2,297,248 | Rudolph | Sept. 29, 1942 |
| 2,371,868 | Berg | Mar. 20, 1945 |

FOREIGN PATENTS

| Number | Country | Date |
|---|---|---|
| 209,835 | Great Britain | Jan. 18, 1924 |
| 368,621 | Great Britain | Mar. 10, 1932 |